United States Patent
Bunker (10) Patent No.: US 11,498,148 B2
(45) Date of Patent: Nov. 15, 2022

(54) METHODS AND APPARATUS TO SYNERGICALLY CONTROL A WELDING-TYPE OUTPUT DURING A WELDING-TYPE OPERATION

(71) Applicant: Illinois Tool Works Inc., Glenview, IL (US)

(72) Inventor: Thomas A. Bunker, De Pere, WI (US)

(73) Assignee: Illinois Tool Works Inc., Glenview, IL (US)

(*) Notice: Subject to any disclaimer, the term of this patent is extended or adjusted under 35 U.S.C. 154(b) by 657 days.

(21) Appl. No.: 15/698,081

(22) Filed: Sep. 7, 2017

(65) Prior Publication Data

US 2019/0070689 A1 Mar. 7, 2019

(51) Int. Cl.
| | |
|---|---|
| *B23K 9/10* | (2006.01) |
| *B23K 9/08* | (2006.01) |
| *B23K 9/12* | (2006.01) |
| *B23K 9/173* | (2006.01) |
| *B23K 9/095* | (2006.01) |

(52) U.S. Cl.
CPC ............. *B23K 9/1087* (2013.01); *B23K 9/08* (2013.01); *B23K 9/0953* (2013.01); *B23K 9/1006* (2013.01); *B23K 9/1043* (2013.01); *B23K 9/125* (2013.01); *B23K 9/173* (2013.01)

(58) Field of Classification Search
CPC ...... B23K 9/08; B23K 9/0953; B23K 9/1006; B23K 9/1043; B23K 9/1087; B23K 9/125; B23K 9/173; B23K 9/0731
See application file for complete search history.

(56) References Cited

U.S. PATENT DOCUMENTS

| | | |
|---|---|---|
| 5,491,321 A | 2/1996 | Stuart et al. |
| 6,087,626 A | 7/2000 | Hutchison et al. |
| | (Continued) | |

FOREIGN PATENT DOCUMENTS

| | | |
|---|---|---|
| CN | 1234306 A | 11/1999 |
| CN | 1610594 A | 4/2005 |
| | (Continued) | |

OTHER PUBLICATIONS

Millermatic(R) 350P Aluminum, MIG Welding Power Source, Wire Feeder and Gun Package, Issued Jul. 1012, Index No. DC/12.56 (4 pgs).

(Continued)

*Primary Examiner* — Dana Ross
*Assistant Examiner* — James F Sims, III
(74) *Attorney, Agent, or Firm* — McAndrews, Held & Malloy, Ltd.

(57) ABSTRACT

Methods and apparatus to synergically control a welding-type output during a welding-type operation are disclosed. An example welding-type power supply includes a power conversion circuit configured to convert input power to welding-type power and to output the welding-type power to a welding-type torch; a communication circuit configured to receive a control signal from a remote control device during a welding-type operation; and a control circuit configured to synergically control a voltage of the welding-type power and a wire feed speed based on the control signal.

11 Claims, 5 Drawing Sheets

(56) References Cited

U.S. PATENT DOCUMENTS

| | | | |
|---|---|---|---|
| 6,103,994 A * | 8/2000 | DeCoster | B23K 9/1087 219/130.5 |
| 6,114,657 A | 9/2000 | Hayes et al. | |
| 6,225,599 B1 | 5/2001 | Altekruse | |
| 6,472,634 B1 | 10/2002 | Houston | |
| 6,956,184 B2 | 10/2005 | Blide | |
| 6,963,048 B2 | 11/2005 | Huismann et al. | |
| 8,604,389 B2 | 12/2013 | Stanzel et al. | |
| 2007/0181553 A1 * | 8/2007 | Stanzel | B23K 9/0953 219/137.71 |
| 2012/0241429 A1 * | 9/2012 | Knoener | B23K 9/32 219/130.01 |
| 2012/0248083 A1 | 10/2012 | Garvey et al. | |
| 2013/0327751 A1 * | 12/2013 | Salsich | B23K 9/124 219/137.71 |
| 2014/0138364 A1 * | 5/2014 | Aberg | B23K 9/1006 219/130.1 |
| 2014/0144898 A1 | 5/2014 | Upton | |
| 2014/0251965 A1 * | 9/2014 | Wiryadinata | B23K 9/0953 219/130.1 |
| 2015/0151383 A1 | 6/2015 | Hillen | |
| 2015/0224591 A1 * | 8/2015 | Ott | H03C 5/00 332/103 |
| 2015/0283639 A1 * | 10/2015 | Henry | B23K 9/173 219/130.51 |
| 2016/0107257 A1 * | 4/2016 | Denis | B23K 9/1087 219/132 |
| 2016/0167153 A1 * | 6/2016 | Denis | B23K 9/173 219/132 |
| 2017/0120365 A1 * | 5/2017 | Kooken | B23K 9/0953 |
| 2017/0129036 A1 | 5/2017 | Christopher | |

FOREIGN PATENT DOCUMENTS

| | | |
|---|---|---|
| CN | 106163720 A | 11/2016 |
| EP | 0167163 | 1/1986 |
| EP | 3165317 | 5/2017 |
| WO | 2004110691 | 12/2004 |
| WO | 2010142858 | 12/2010 |

OTHER PUBLICATIONS

Millermatic 350P Aluminum 200/230/460 V, Standard Unit 907474, 2012 (10 pgs).

Int'l Search Report and Written Opinion Appln. PCT/US2018/049872 dated Feb. 1, 2019 (13 pgs).

Introducing the Millermatic 350P Aluminum All-in-One MIG Welder, https://www.youtube.com/watch?v=TAqDAh5payk, published Nov. 14, 2012 (2 pgs).

Canadian Office Action Appln No. 3,073,577 dated Apr. 20, 2021.

* cited by examiner

| Steel, 0.35" Wire Diameter ||||
|---|---|---|---|
| Input Value | Voltage | WFS (ipm) | Mode |
| 1 | 14.0V | 90 | CSC |
| 2 | 14.1V | 95 | CSC |
| 3 | 14.2V | 100 | CSC |
| ... | ... | ... | ... |
| 51 | 18.1V | 220 | Short Arc |
| 52 | 18.2V | 225 | Short Arc |
| ... | ... | ... | ... |
| 95 | 24.6V | 400 | Spray |
| 96 | 24.7V | 410 | Spray |
| 97 | 24.8V | 420 | Spray |
| 98 | 24.9V | 430 | Spray |
| 99 | 25.0V | 440 | Spray |
| 100 | 25.1V | 445 | Spray |
| ... | ... | ... | ... |

METHODS AND APPARATUS TO SYNERGICALLY CONTROL A WELDING-TYPE OUTPUT DURING A WELDING-TYPE OPERATION

BACKGROUND

This disclosure relates generally to welding and, more particularly, to methods and apparatus to synergically control a welding-type output during a welding-type operation.

SUMMARY

Methods and apparatus to synergically control a welding-type output during a welding-type operation are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Gas Metal Arc Welding (GMAW), also referred to as MIG welding, is conventionally performed with a wire feed speed and voltage that is preselected prior to performing a weld. For instance, conventional welding power supplies may be controlled via knobs or buttons on the front panel of the welding power supply. If the operator selects too little power, the resulting weld may lack fusion and the weld may fail. Conversely, if the operator selects too much power, burn-through of the material may occur, creating a hole instead of a welded joint.

Some conventional welders, such as the Millermatic® 211 Auto-Set™ MIG Welder from Miller Electric Mfg. Co., makes the task of selecting weld parameters easier by permitting the operator to select both wire feed speed and voltage based on the wire size and material thickness. Preselection of the welding parameters is effective when the workpiece is of a uniform thickness and geometry, but in some situations the workpiece may have varying thickness and/or geometry. For instance, if an operator is welding a workpiece in which the workpiece progressively narrows, the heat sink capability of the metal is reduced and using the same power settings for the entire distance may result in burn-through and creating a hole.

Disclosed example methods and apparatus provide a welding-type power supply for GMAW welding that enables an operator to synergically adjust the output power during welding. An example method of synergic adjustment by an operator involves manipulating a control on the torch that is easily accessible to the operator during welding.

Where conventional welding-type power supplies may provide recommended voltage and wire feed speed, and permit a user to vary the voltage and/or wire feed speed within a specified narrow range, disclosed examples provide a control device that permits the operator to adjust the output power of a GMAW welding-type power supply over a wide operation range. For example, a manually adjustable control on the weld torch may be provided to adjust the power synergically by simultaneously changing the output voltage and the wire feed speed to raise or lower the output power to suit the work conditions and the weldment. The example welding torch, and the attached power supply and/or remote wire feeder, changes the welding output power and/or the wire feed speed while the operator is welding with an easy to use method such as a variable-input (e.g., analog input) trigger.

Some example methods and apparatus further automatically change a mode of operation or deposition mode during welding, such that the operator can change processes on-the-fly in a continuously variable manner, such that the operator has a very wide operating range of the output power. For example, if the operator wants to go from a first power operation or deposition mode (e.g., short arc welding) to a higher power operation or deposition mode (e.g., pulse spray welding), such as if the operator encounters an increase in the thickness of the work piece being welded, a power control circuit may follow a synergic control scheme to slowly raise the output voltage and the wire feed speed until the wire transitions from a short arc condition to a pulsed spray condition. In another example scenario, the a power control circuit may allow the operator to transition from a first power operation or deposition mode (e.g., short arc welding) to a lower power operation or deposition mode (e.g., Regulated Metal Deposition (RMD™)). Disclosed examples enable an operator to enter other deposition modes, such as a Controlled Short Circuit (CSC) process, and/or arcless 'hotwire' deposition. An operator may change between the different deposition modes on-the-fly during a welding operation to finely control wire deposition and/or heat input to the weld.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a welding-type power supply refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, a "weld voltage setpoint" refers to a voltage input to the power converter via a user interface, network communication, weld procedure specification, or other selection method.

As used herein, a "circuit" includes any analog and/or digital components, power and/or control elements, such as a microprocessor, digital signal processor (DSP), software, and the like, discrete and/or integrated components, or portions and/or combinations thereof.

As used herein, "synergic control" refers to controlling two or more variables or components according to a specified relationship.

As used herein, the term "remote wire feeder" refers to a wire feeder that is not integrated with the power supply in a single housing.

Disclosed example welding-type power supplies include a power conversion circuit, a communication circuit, and a control circuit. The power conversion circuit converts input power to welding-type power and outputs the welding-type power to a welding-type torch. The communication circuit receives a control signal from a remote control device during a welding-type operation, and the control circuit synergically controls a voltage of the welding-type power and a wire feed speed based on the control signal.

In some examples, the control circuit synergically controls the voltage and the wire feed speed by: setting a commanded power level of the welding-type power based on the control signal, determining the voltage and the wire feed speed corresponding to the commanded power level, controlling the power conversion circuit to output the voltage, and controlling a wire feeder based on the wire feed speed. In some such examples, the control circuit accesses a lookup table to determine the commanded power level of the welding-type power based on the control signal.

In some example welding-type power supplies, the communication circuit receives the control signal from at least one of the welding-type torch or a foot pedal. In some examples, the control circuit synergically controls the voltage of the welding-type power by changing a deposition mode from a first deposition mode to a second deposition mode in response to the control signal. In some such examples, the first deposition mode is an arcless hotwire mode, a regulated metal deposition mode, a controlled short circuit mode, a short arc mode, a pulse spray mode, or a spray transfer mode, and the second deposition mode is another of the arcless hotwire mode, the regulated metal deposition mode, the controlled short circuit mode, the short arc mode, the pulse spray mode, or the spray transfer mode.

In some example welding-type power supplies, the control circuit synergically controls the voltage of the welding-type power and the wire feed speed to enable manual control of a heat input to the welding-type operation in real time during the welding-type operation. In some examples, the control circuit synergically controls the voltage of the welding-type power and the wire feed speed by controlling a remote wire feeder based on the wire feed speed. In some example welding-type power supplies as defined in claim 1, the control circuit selects the voltage from a substantially contiguous voltage range and selects the wire feed speed from a substantially contiguous wire feed speed range.

Disclosed example control devices for a welding-type system include an input circuit, a control circuit, and an output circuit. The input circuit identifies a user input during a welding-type operation involving welding-type power. The control circuit determines a voltage adjustment of the welding-type power and a wire feed speed adjustment based on the user input, and based on a synergic control scheme for a voltage of the welding-type power and a wire feed speed. The output circuit generates one or more control signals to control a welding-type power supply providing the welding-type power to perform the voltage adjustment and to control a wire feeder to perform the wire feed speed adjustment.

In some example control devices, the control circuit determines the voltage adjustment and the wire feed speed adjustment based on the synergic control scheme by looking up the voltage adjustment and the wire feed speed adjustment in a lookup table. In some examples, the control circuit changes a deposition mode from a first deposition mode to a second deposition mode in response to the user input based on at least one of the voltage adjustment or the wire feed speed adjustment. In some such examples, the first deposition mode is an arcless hotwire mode, a regulated metal deposition mode, a controlled short circuit mode, a short arc mode, a pulse spray mode, or a spray transfer mode, and the second deposition mode is another of the arcless hotwire mode, the regulated metal deposition mode, the controlled short circuit mode, the short arc mode, the pulse spray mode, or the spray transfer mode.

In some example control circuits, the output circuit transmits at least one of the one or more control signals to a remote wire feeder to control the remote wire feeder based on the wire feed speed adjustment. In some examples, the output circuit transmits at least one of the one or more control signals to the welding-type power supply to control the welding-type power supply based on the voltage adjustment. In some examples, the control device is a welding-type torch, a foot pedal, the welding-type power supply, or a remote wire feeder.

Figure 1:
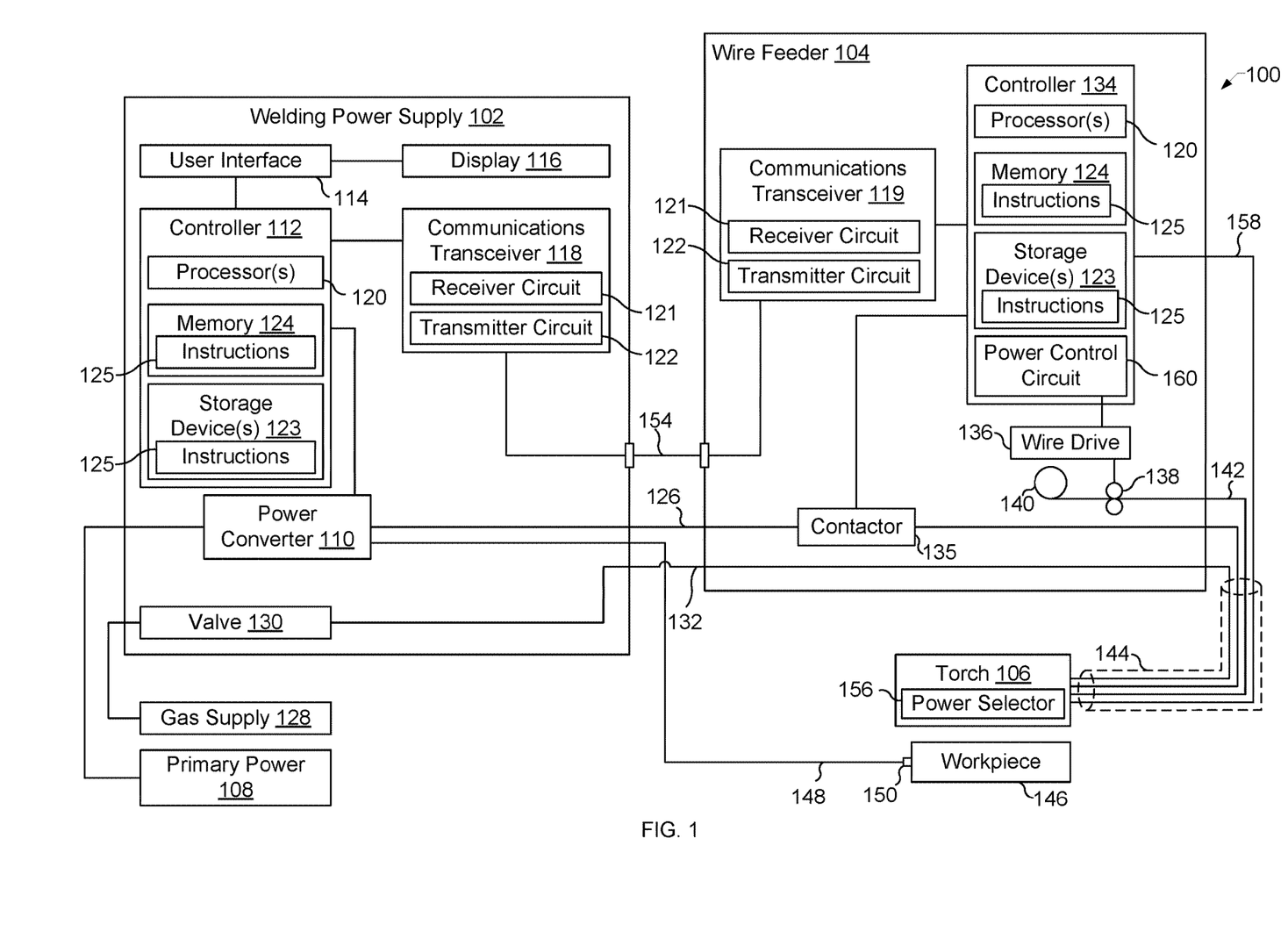
FIG. 1 is a block diagram of an example welding-type system including a remote wire feeder and configured to provide synergic power control, in accordance with aspects of this disclosure.

Turning now to the drawings, FIG. 1 is a block diagram of an example welding system 100 having a welding-type power supply 102, a wire feeder 104, and a welding torch 106. The welding system 100 powers, controls, and supplies consumables to a welding application. The example welding torch 106 is configured for gas metal arc welding (GMAW). In the illustrated example, the power supply 102 is configured to supply power to the wire feeder 104, and the wire feeder 104 may be configured to route the input power to the welding torch 106. In addition to supplying an input power, the wire feeder 104 supplies a filler metal to a welding torch 106 for various welding applications (e.g., GMAW welding, flux core arc welding (FCAW)).

The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes a power converter 110, which may include transformers, rectifiers, switches, and so forth, capable of converting the AC input power to AC and/or DC output power as dictated by the demands of the system 100 (e.g., particular welding processes and regimes). The power converter 110 converts input power (e.g., the primary power 108) to welding-type power based on a weld voltage setpoint and outputs the welding-type power via a weld circuit.

In some examples, the power converter 110 is configured to convert the primary power 108 to both welding-type power and auxiliary power outputs. However, in other examples, the power converter 110 is adapted to convert primary power only to a weld power output, and a separate auxiliary converter is provided to convert primary power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The power supply 102 includes a controller 112 to control the operation of the power supply 102. The power supply 102 also includes a user interface 114. The controller 112 receives input from the user interface 114, through which a user may choose a process and/or input desired parameters (e.g., voltages, currents, particular pulsed or non-pulsed welding regimes, and so forth). The user interface 114 may receive inputs using any input device, such as via a keypad, keyboard, buttons, touch screen, voice activation system, wireless device, etc. Furthermore, the controller 112 controls operating parameters based on input by the user as well as based on other current operating parameters. Specifically, the user interface 114 may include a display 116 for presenting, showing, or indicating, information to an operator. The controller 112 may also include interface circuitry for communicating data to other devices in the system 100, such as the wire feeder 104. For example, in some situations, the power supply 102 wirelessly communicates with the wire feeder 104 and/or other welding devices within the welding system 100. Further, in some situations, the power supply 102 communicates with the wire feeder 104 and/or other welding devices using a wired connection, such as by using a network interface controller (NIC) to communicate data via a network (e.g., ETHERNET, 10BASE2, 10BASE-T, 100BASE-TX, etc.).

The controller 112 includes at least one processor 120 that controls the operations of the power supply 102. The controller 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device and/or logic circuit. For example, the processor 120 may include one or more digital signal processors (DSPs).

The example controller 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding current data, detect short circuit parameters, determine amount of spatter) during operation.

In some examples, the welding power flows from the power converter 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage).

The example communications transceiver 118 includes a receiver circuit 121 and a transmitter circuit 122. Generally, the receiver circuit 121 receives data transmitted by the wire feeder 104 and the transmitter circuit 122 transmits data to the wire feeder 104. The example wire feeder 104 also includes a communications transceiver 119, which may be similar or identical in construction and/or function as the communications transceiver 118.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the controller 112 to enable, inhibit, or control gas flow (e.g., shielding gas) through the valve 130. Shielding gas exits the valve 130 and flows through a cable 132 (which in some implementations may be packaged with the welding power output) to the wire feeder 104 which provides the shielding gas to the welding application. In some examples, the welding system 100 does not include the gas supply 128, the valve 130, and/or the cable 132. In some other examples, the valve 130 is located in the wire feeder 104, and, the gas supply 128 is connected to the wire feeder 104.

In some examples, the wire feeder 104 uses the welding power to power the various components in the wire feeder 104, such as to power a wire feeder controller 134. As noted above, the weld cable 126 may be configured to provide or supply the welding power. The wire feeder controller 134 controls the operations of the wire feeder 104. In some examples, the wire feeder 104 uses the wire feeder controller 134 to detect whether the wire feeder 104 is in communication with the power supply 102 and to detect a current welding process of the power supply 102 if the wire feeder 104 is in communication with the power supply 102.

A contactor 135 (e.g., high amperage relay) is controlled by the wire feeder controller 134 and configured to enable or inhibit welding power to continue to flow to the weld cable 126 for the welding application. In some examples, the contactor 135 is an electromechanical device. However, the contactor 135 may be any other suitable device, such as a solid state device, and/or may be omitted entirely and the weld cable 126 is directly connected to the output to the weld torch 106. The wire feeder 104 includes a wire drive 136 that receives control signals from the wire feeder controller 134 to drive rollers 138 that rotate to pull wire off a spool 140 of wire. The wire drive 136 feeds electrode wire to the weld torch 106. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power converter 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146.

A communication cable 154 connected between the power supply 102 and the wire feeder 104, which enables bidirectional communication between the transceivers 118, 119. The communications transceivers 118 and 119 may communicate via the communication cable 154, via the weld circuit, via wireless communications, and/or any other communication medium. Examples of such communications include weld cable voltage measured at a device that is remote from the power supply 102 (e.g., the wire feeder 104).

The example torch 106 includes a power selector circuit 156 to permit the user of the torch (e.g., the welder) to make adjustments to the welding output from the torch in a synergic manner. For example, as the user makes adjustments via the power selector circuit 156, the power supply 102 and the wire feeder 104 synergically change the output voltage and the wire feed speed of the weld. An example implementation of the power selector circuit 156 is a pressure-sensitive trigger. For instance, the torch 106 may include the same trigger used in conventional welding-type torches, modified to provide an analog signal or encoded digital signal to represent an amount of input to the trigger. In some examples, the operator may incrementally depress the trigger (e.g., apply more pressure) to synergically increase the voltage and wire feed speed and/or incrementally release the trigger (e.g., apply less pressure) to synergically decrease the voltage and wire feed speed. Alternative implementations of the power selector circuit 156 include a wheel or slide configured to control a potentiometer and positioned to enable an operator to manipulate the input while welding (e.g., while simultaneously holding the trigger).

The power selector circuit 156 outputs a control signal 158 to a power control circuit 160 of the wire feeder 104. The control signal 158 may be an analog or digital signal that represents the output from the power selector circuit 156. The example power control circuit 160 may be implemented using the controller 134 and/or as a separate circuit. The power control circuit 160 identifies a user input (e.g., an input from the power selector circuit 156) during a welding-type operation involving welding-type power. The power control circuit 160 determines, based on the user input, a voltage adjustment for the welding-type power and a wire feed speed adjustment. For example, the power control circuit 160 may reference a synergic control scheme, such as an algorithm or a lookup table, to determine a voltage setpoint and/or a wire feed speed setpoint corresponding to the user input. A lookup table may be stored in, for example, the storage device(s) 123 and/or the memory 124 of the controller 134.

The example power control circuit 160 generates one or more control signals to control the welding-type power supply 102 to perform a voltage adjustment and to control the wire feeder 104 to perform a wire feed speed adjustment. For example, the power control circuit 160 may provide a wire feed speed command to the controller 134 to control the wire feed speed of the wire drive 136, and/or transmit a control signal to the power supply 102 via the communications transceiver 119 and the communications cable 154 to control the output voltage of the power supply 102.

In some examples, the synergic control of the voltage and the wire feed speed causes the power control circuit 160 to change a deposition mode in response to the user input via the power selector circuit 156. For example, GMAW deposition modes, such as an arcless hotwire mode, a regulated metal deposition mode, a controlled short circuit mode, a short arc mode, a pulse spray mode, or a spray transfer mode, typically correspond to different voltage ranges (with some overlap between some modes).

Figure 2:
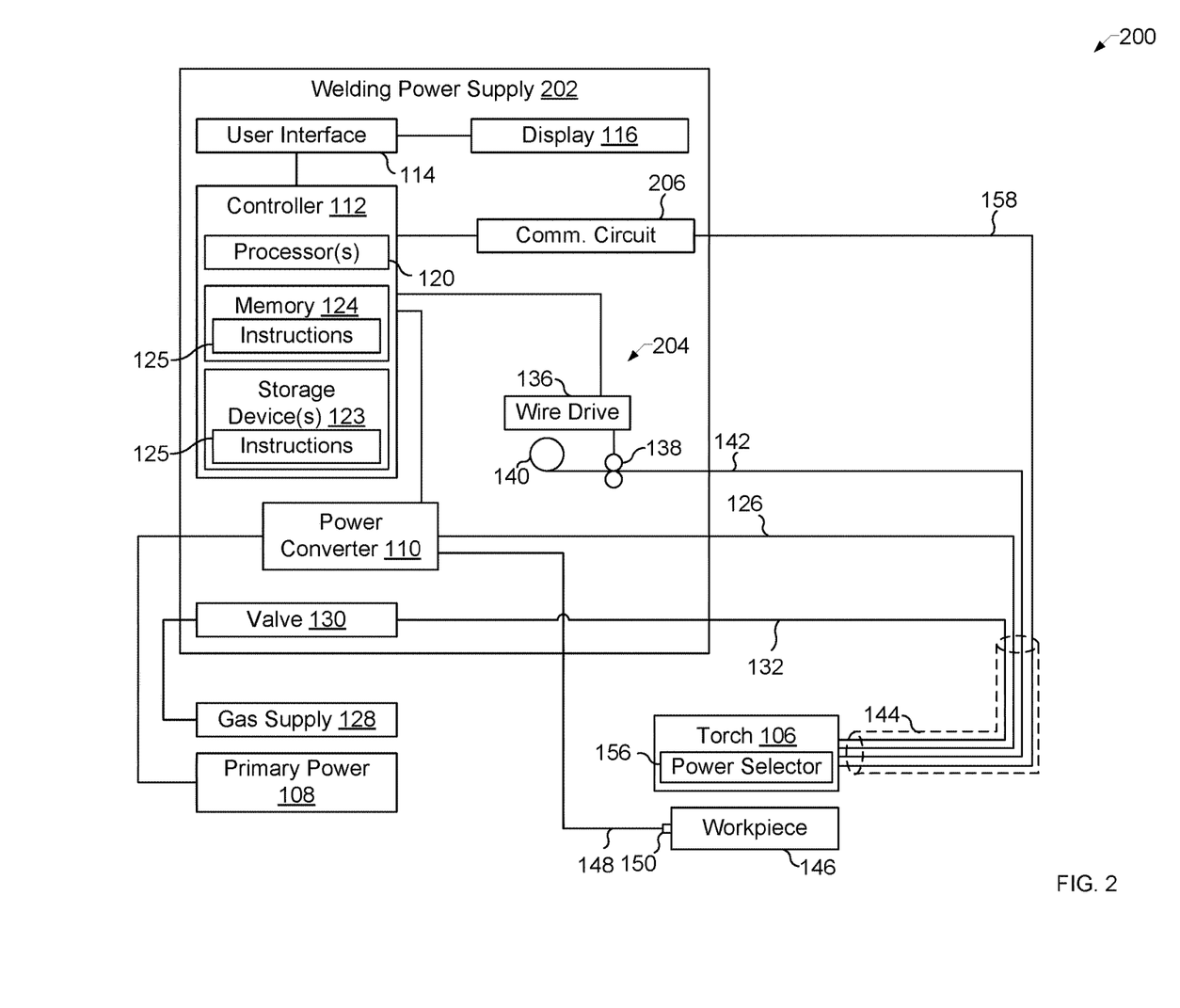
FIG. 2 is a block diagram of another example welding-type system configured to provide synergic power control with a welding-type power supply having an integrated wire feeder, in accordance with aspects of this disclosure.

FIG. 2 is a block diagram of another example welding-type system 200 configured to provide synergic power control with a welding-type power supply 202 having an integrated wire feeder 204. The example welding-type power supply 202 includes the power converter 110, controller 112, the user interface 114, the display 116, the processor(s) 120, the storage devices(s) 123, the memory 124, the instructions 125, and the valve 130 of the example power supply 102 of FIG. 1.

In contrast with the example system 100, in the example of FIG. 2 the power supply 202 includes the integrated wire feeder 204 instead being connected to a remote wire feeder. The power supply 202 of FIG. 2 outputs welding-type power and electrode wire to the torch 106, which includes the example power selector circuit 156.

The integrated wire feeder 204 includes the wire drive 136, the drive rollers 138, and the wire spool 140, and feeds the wire through a torch cable 142 to the torch 106.

The example welding-type power supply 202 includes a communication circuit 206 to receive the control signal 158 from the power selector circuit 156 (e.g., during a welding operation). In some examples, the communication circuit 206 converts an analog signal to a digital signal for use by the controller 112 and/or receives a digital signal from the power selector circuit 156. The example controller 112 synergically controls the voltage of the welding-type power (e.g., by controlling the power converter 110) and the wire feed speed (e.g., by controlling the wire drive 136) based on the control signal 158. In this manner, the example controller 112 may operate in a similar manner as the power control circuit 160 of FIG. 1.

The controller 112 may reference a synergic control scheme, such as an algorithm or a lookup table, to determine a voltage setpoint and/or a wire feed speed setpoint corresponding to the user input. A lookup table may be stored in, for example, the storage device(s) 123 and/or the memory 124 of the controller 112.

Figure 3:
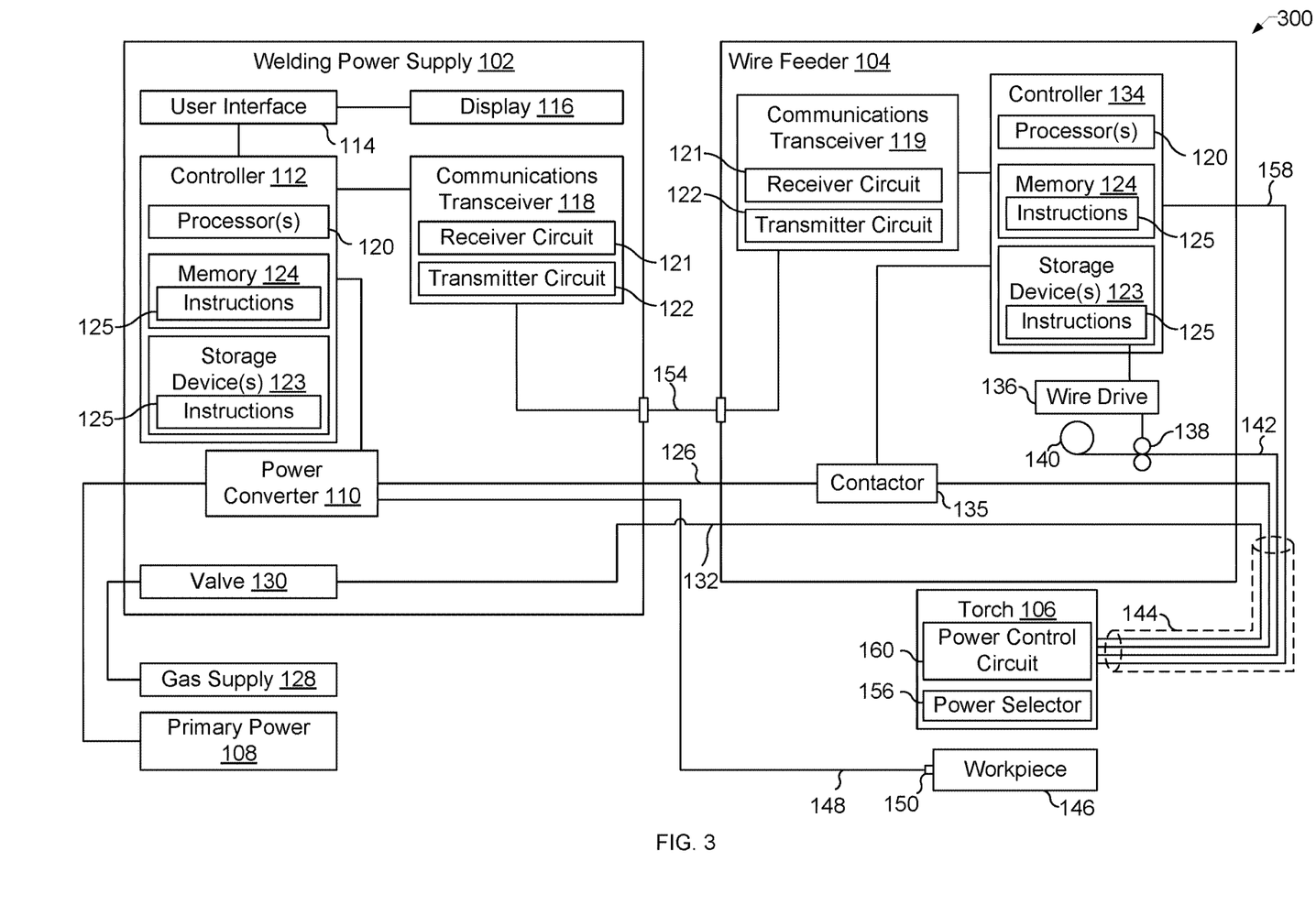
FIG. 3 is a block diagram of another example welding-type system including a power control circuit configured to provide synergic power control, in accordance with aspects of this disclosure.

FIG. 3 is a block diagram of another example welding-type system 300 including a torch 302 having a power control circuit configured to provide synergic power control. The example power control circuit 304 in the torch 106 may be implemented in a similar manner as the power control circuit 160 described above with reference to FIG. 1.

Figure 4:
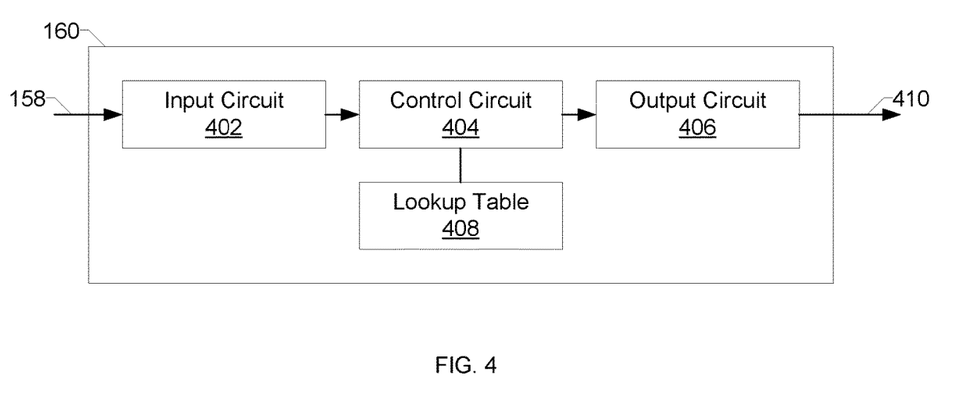
FIG. 4 is a block diagram of an example implementation of the power control circuit of FIG. 3.

FIG. 4 is a block diagram of an example implementation of the power control circuit 160 of FIGS. 1 and 3. The power control circuit 160 of FIG. 4 may be implemented, for example, in the torch 106, the remote wire feeder 104, a foot pedal, the power supply 102, and/or any other component of the systems 100, 200, 300 of FIGS. 1-3.

The example power control circuit 160 of FIG. 4 includes an input circuit 402, a control circuit 404, and an output circuit 406. The input circuit 402 identifies a user input during a welding-type operation involving welding-type power. For example, the input circuit 402 may receive the control signal 158 from the power selector circuit 156 when an operator controls the power selector circuit 156 during a weld to synergically adjust the welding output.

The control circuit 404 determines a voltage adjustment of the welding-type power and a wire feed speed adjustment based on the user input (e.g., based on the control signal 158). For example, the control circuit 404 may determine the voltage adjustment and the wire feed speed adjustment by interpreting the user input according to a synergic control scheme relating the voltage of the welding-type power and the wire feed speed output by the torch 106. In the example of FIG. 4, the control circuit 404 may look up the voltage adjustment and the wire feed speed adjustment in a lookup table based on the control signal 158.

In some examples, the control circuit 404 identifies or determines that the deposition mode is to be changed (e.g., from a first deposition mode to a second deposition mode) in response to the user input. For example, as the synergic control scheme causes the voltage to increase or decrease, a threshold may be crossed that causes the control circuit 404 to determine (e.g., based the voltage adjustment, the wire feed speed adjustment, the lookup table 408, and/or any other synergic control factors) that the output power is more appropriately suited to a different deposition mode or transfer mode. Example deposition modes that may be selected by the control circuit 404 include an arcless hotwire mode, a regulated metal deposition mode, a controlled short circuit mode, a short arc mode, a pulse spray mode, or a spray transfer mode. In some examples, the control circuit 404 may apply a hysteresis to the thresholds so that the control circuit 404 does not repeatedly switch between deposition modes having similar or overlapping voltage and/or wire feed speed ranges.

The output circuit 406 generates one or more control signals 410 to control the power supply 102 providing the welding-type power (e.g., to the torch 106) to perform the voltage adjustment, and/or to control the wire feeder 104 to perform the wire feed speed adjustment. In some examples, the one or more control signals 410 are transmitted to different devices (e.g., the power supply 102 and the remote wire feeder 104). In some other examples, the one or more control signals 410 are transmitted to a single device (e.g., from the power supply 102 to the remote wire feeder 104, from the remote wire feeder 104 to the power supply 102, from the torch 106 to the power supply 202 including the integrated wire feeder 204, etc.).

Figure 5:
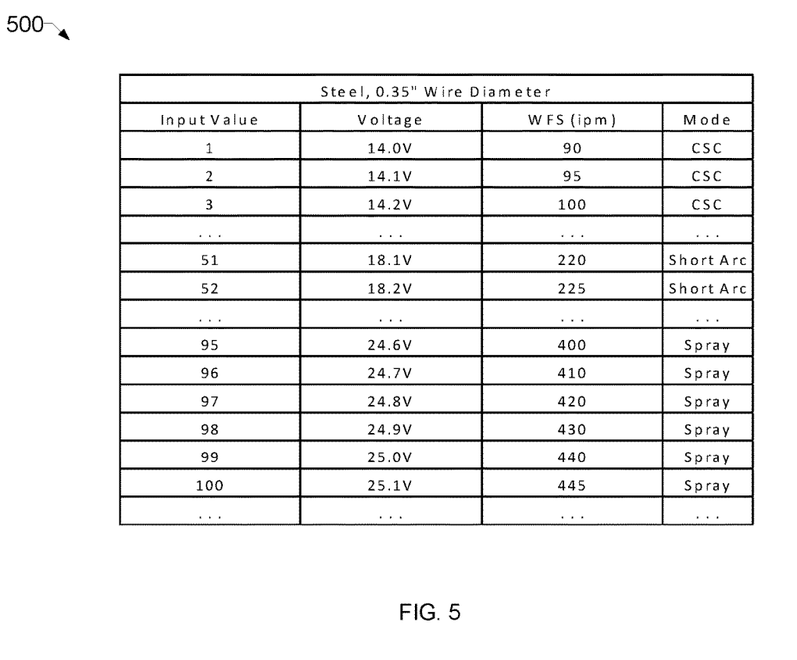
FIG. 5 is an example table including corresponding voltage, wire feed speed, and process modes that may be used to determine voltage setpoints, wire feed speed setpoints, and/or process modes for performing welding operations.

FIG. 5 is an example table 500 including corresponding voltage, wire feed speed, and process modes that may be used to determine voltage setpoints, wire feed speed setpoints, and/or process modes for performing welding operations. The example table 500 may be used to implement the lookup table 408 of FIG. 4. While one example table 500 is shown in FIG. 5, the lookup table 408 may include multiple tables corresponding to different welding conditions (e.g., different workpiece materials, different wire types, different gas types, etc.). The synergic control scheme represented in the lookup table 408 enables the operator to adjust the welding output to react to changes in welding conditions, such as changes in workpiece thickness and/or seam orientation.

The example lookup table 500 of FIG. 5 correlates different input values (e.g., values represented by the control signal 158) with corresponding voltages (e.g., arc voltage setpoints), wire feed speeds, and/or deposition modes. For example, as an operator increases a value of the control signal 158 and/or decreases the value of the control signal 158 during a welding-type operation. (e.g., by incrementally depressing and/or releasing the trigger, by increasing and/or decreasing a control device that is operatively linked to a potentiometer, etc.), the control circuit 404 of FIG. 4 may look up incrementally increasing and/or decreasing input values in the table 500 to determine the corresponding output voltage, wire feed speed, and/or deposition mode. In some examples, the corresponding voltages, wire feed speeds, and/or deposition modes are empirically determined and populated into the table 500 prior to the welding operations (e.g., during manufacture, downloading a firmware update, downloading a software package, etc.).

Figure 6:
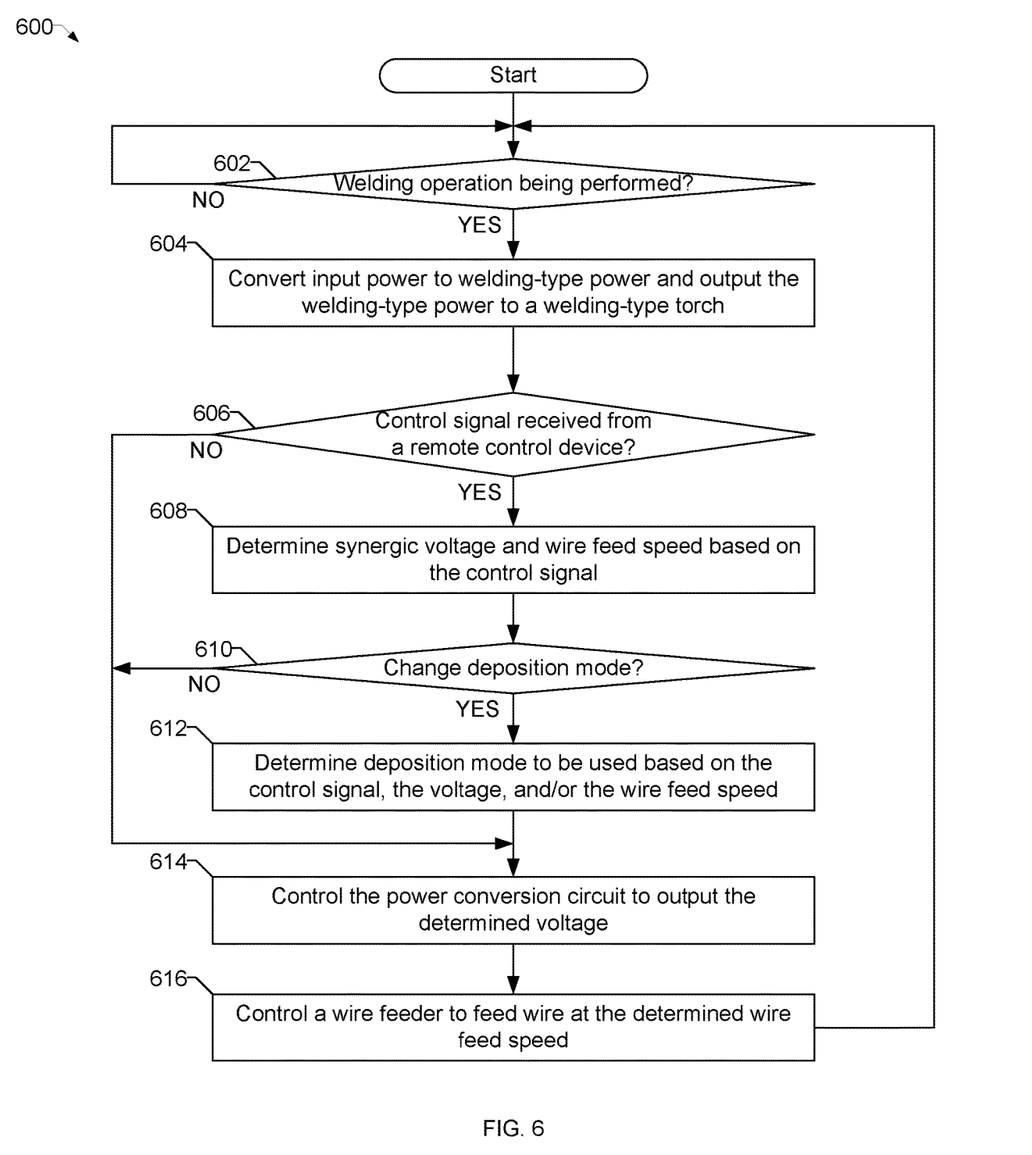
FIG. 6 is a flowchart representative of example machine readable instructions which may be executed to implement one or more disclosed example methods and/or apparatus.

FIG. 6 is a flowchart representative of example machine readable instructions 600 which may be executed to implement one or more disclosed example methods and/or apparatus. The example instructions 600 may be executed by the example controller 112, the example controller 134, and/or the example power control circuit 160 of FIGS. 1-4 to synergically control a welding-type output during a welding-type operation. The example instructions 600 are described with reference to the example welding-type power supply 202 of FIG. 2, but may be modified for execution by the power control circuit 160 of FIGS. 1, 3, and/or 4.

At block 602, the example controller 112 determines whether a welding operation is being performed. If a welding operation is not being performed (block 602), the control circuit 404 iterates block 602 until welding is occurring. When the controller 112 determines that welding is occurring (block 602), at block 604 the power converter 110 converts input power to welding-type power and outputs the welding-type power to the welding-type torch 106.

At block 606, the communications circuit 206 determines whether a control signal (e.g., the control signal 158) is received from a remote control device (e.g., from the power selector circuit 156). If the control signal 158 has been received from the remote control device (block 606), at block 608 the controller 112 determines the synergic voltage and the wire feed speed based on the control signal 158.

At block 610, the controller 112 determines whether a change in deposition mode is required (e.g., based on the synergic control scheme used to determine the synergic voltage and the wire feed speed). If a change in deposition mode is required (block 610), at block 612 the controller 112 determines a deposition mode to be used based on the control signal, the voltage, and/or the wire feed speed.

After determining the deposition mode (block 612), if no change in the deposition mode is to occur (block 610), or if no control signal has been received (block 606), at block 614 the controller 112 controls the power converter 110 to output the determined voltage (e.g., via direct control and/or via a transceiver circuit).

At block 616, the controller 112 controls a wire feeder (e.g., the integrated wire feeder 204, the remote wire feeder 104) to feed wire at the determined wire feed speed (e.g., via direct control and/or via a transceiver circuit).

After controlling the power converter 110 and/or the wire feeder 104, 204, control returns to block 602.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   a power conversion circuit configured to convert input power to welding-type power and to output the welding-type power to a welding-type torch;
   a communication circuit configured to receive a control signal from a remote control device during a welding-type operation; and
   a control circuit configured to execute machine readable instructions to synergically control a voltage of the welding-type power and a wire feed speed during the welding-type operation based on the control signal by:
   setting a commanded power level of the welding-type power based on the control signal;
   determining the voltage and the wire feed speed corresponding to the commanded power level according to a specified relationship between the voltage and wire feed speed at the commanded power level;
   controlling the power conversion circuit to output the voltage; and
   controlling a wire feeder based on the wire feed speed.

2. The welding-type power supply as defined in claim 1, wherein the control circuit is configured to access a lookup table to determine the commanded power level of the welding-type power based on the control signal.

3. The welding-type power supply as defined in claim 1, wherein the communication circuit is configured to receive the control signal from at least one of the welding-type torch or a foot pedal.

4. The welding-type power supply as defined in claim 1, wherein the control circuit is configured to synergically control the voltage of the welding-type power by changing a deposition mode from a first deposition mode to a second deposition mode in response to the control signal.

5. The welding-type power supply as defined in claim 4, wherein the first deposition mode is an arcless hotwire mode, a regulated metal deposition mode, a controlled short circuit mode, a short arc mode, a pulse spray mode, or a spray transfer mode, and the second deposition mode is another of the arcless hotwire mode, the regulated metal deposition mode, the controlled short circuit mode, the short arc mode, the pulse spray mode, or the spray transfer mode.

6. The welding-type power supply as defined in claim 1, wherein the control circuit is configured to synergically control the voltage of the welding-type power and the wire feed speed to enable manual control of a heat input to the welding-type operation in real time during the welding-type operation.

7. The welding-type power supply as defined in claim 1, wherein the control circuit is configured to synergically control the voltage of the welding-type power and the wire feed speed by controlling a remote wire feeder based on the wire feed speed.

8. The welding-type power supply as defined in claim 1, wherein the control circuit is configured to select the voltage from a voltage range and select the wire feed speed from a wire feed speed range.

9. The welding-type power supply of claim 1, wherein the control signal comprises at least one of an analog signal or an encoded digital signal and the control signal is representative of an amount of depression of at least one of a torch trigger or a foot pedal.

10. The welding-type power supply of claim 1, wherein the control circuit is configured to synergically control the voltage of the welding-type power and the wire feed speed based on the control signal by controlling at least the voltage and the wire feed speed according to a predetermined relationship between the voltage and the wire feed speed.

11. The welding-type power supply of claim 1, wherein the control circuit is configured to synergically control the voltage of the welding-type power and the wire feed speed based on the control signal by determining a voltage setpoint and a wire feed speed setpoint corresponding to the control signal.

* * * * *